A. BLAUVELT.
DETECTOR METER.
APPLICATION FILED MAR. 21, 1907.
980,188.
Patented Jan. 3, 1911.
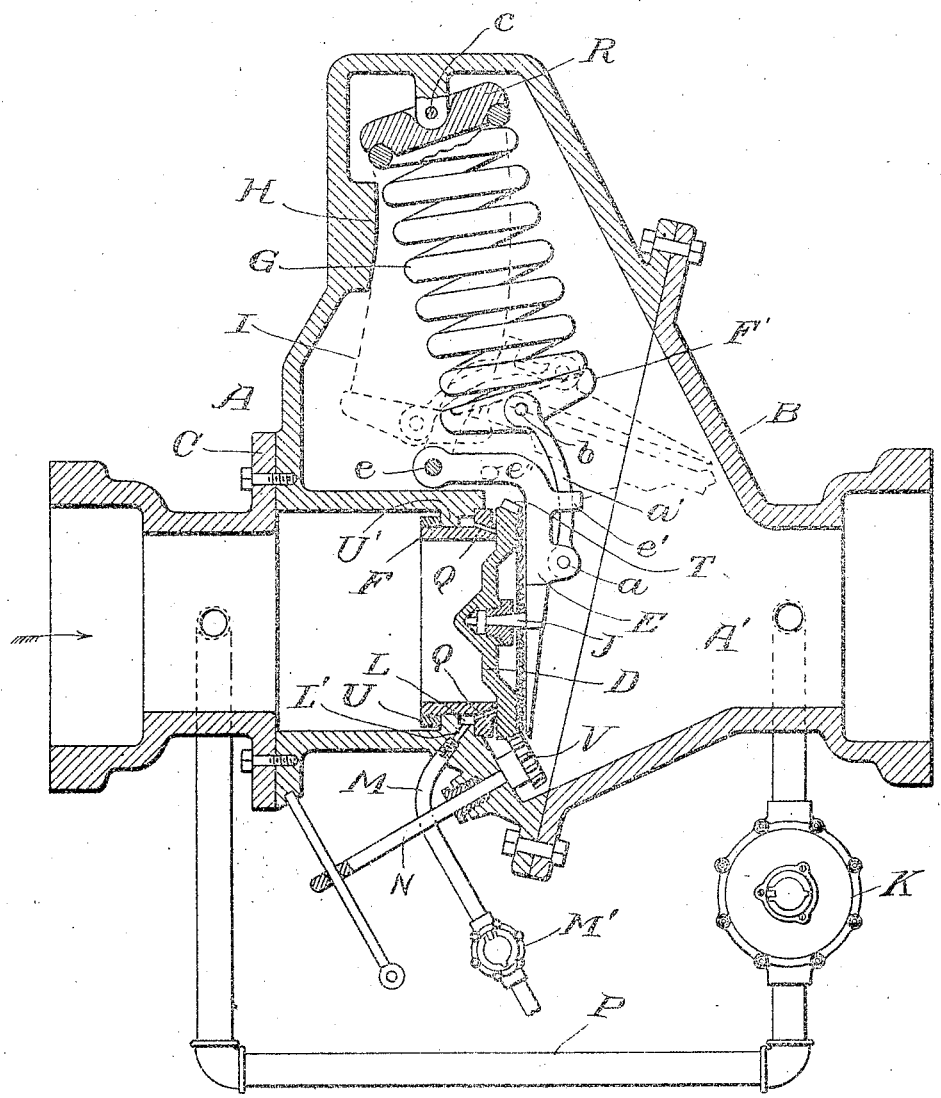
Witnesses.
H. A. Hall
Louis B. Erwin
Inventor:
Albert Blauvelt.
by Rector, Hibben & Davis
His Atty's

UNITED STATES PATENT OFFICE.

ALBERT BLAUVELT, OF CHICAGO, ILLINOIS.

DETECTOR-METER.

980,188. Specification of Letters Patent. Patented Jan. 3, 1911.

Application filed March 21, 1907. Serial No. 363,775.

*To all whom it may concern:*

Be it known that I, ALBERT BLAUVELT, a citizen of the United States, residing at Chicago, in the county of Cook and State of Illinois, have invented a new and useful Detector-Meter, of which the following is a specification.

This invention relates to hydraulic systems, and more particularly to those in connection with which meters are employed. Its principal objects are to provide such a system which will measure a normal quantity of fluid in the usual or any convenient manner, and which will permit a greater flow, as for a fire service, to pass unobstructed by the meter and yet to give an indication of its occurrence.

The drawing shows in vertical section a valve, together with associated apparatus and conduits arranged in accordance with my invention.

The character A designates a section of a main conduit, of such area as to permit the passage of the maximum fluid-flow without undue resistance, and, in the present instance, furnished in part by the casing of a valve or controlling device A'. Attached to the casing are end pieces B and C for connection with the main conduit and furnishing a portion thereof. Opening from separated points in the conduit, here illustrated as joined to the end pieces, is a smaller conduit or by-pass P, in which is a suitable meter K.

The valve A' is preferably of the "check" type, it having a disk D coöperating with an annular seat F secured in place by a nut U contacting with an annular flange U'. The disk may be carried by an arm E pivoted at $e$ upon the casing and swinging toward the eduction end of the by-pass to open the valve. The disk is shown as rotatably mounted upon its arm, it turning about a pin J projecting therefrom. About the periphery of said disk are gear teeth T, with which may engage a pinion V carried by a shaft N rotatable in and longitudinally movable through a properly packed opening in the casing. The turning of the valve-disk by its gearing, enables the contacting surfaces between it and the seat to be cleaned. This mechanism need not, however, be particularly described, as it is not important in connection with the present invention.

Pivoted at $a$ upon the valve arm is a link $a'$ swinging between stops $e'$ $e''$ projecting from the arm laterally of the casing, and having mounted pivotally at $b$ at its upper extremity a seat or socket F'. Between F' and a similar seat R pivoted at $c$ depending from the upper portion of the casing, is interposed a spiral spring G which is normally somewhat under compression. At one side of the spring, projecting from the wall of the casing, is a curved abutment H, which, when the spring contacts therewith, compels it to assume a laterally flexed position, this occurring whenever the lower extremity of the spring is situated as indicated in dotted lines at I.

In the valve-seat is a series of passages Q leading from its contact surface with the disk to an annular space or chamber L formed between the seat and the flange U'. This chamber communicates through a passage L' in the casing with a pipe M, open to the atmosphere but having in it an indicating mechanism through which any discharge occurs, and which in the present instance is in the form of a meter M'.

In the operation of my invention, all the elements are normally as shown in solid lines in the drawing and the passage of the fluid is in the direction indicated by the arrow. The check-disk is pressed against its seat by the spring, which is under sufficient compression to cause more than a normal meter resistance to the fluid-flow, said resistance being introduced by the by-pass. In addition to the force exerted by the spring, the communication of the passages Q with the atmosphere causes an excess of static pressure on the outlet side of the valve, or that toward the eduction opening of the by-pass, because of its greater effective area, said excess pressure being transmitted through said by-pass. This differential assists the spring in keeping the valve normally closed, the proportional pressure exerted by the two forces varying in accordance with the spring-tension, area of valve and openings and the like. The meter K and by-pass therefore offer a less resistance to flow than does the valve, and permit any normal consumption of fluid to occur therethrough and the meter to record it.

Upon an unusual rush of fluid through the system, as might occur for fire-service, the disk will be forced away from its seat by the impact of the fluid and by the excess of pressure at the induction side of the by-pass over that transmitted through it. The first flow will be in the form of a thin sheet and will exert an opening force effective over the entire area of the disk, which is larger than that presented before the actual opening begins. At the same time the static differential due to the passages Q entirely disappears, therefore any given water pressure capable of starting the disk from its seat will immediately afterward have increased power to force said disk toward its fully open position, against the tension of the spring. As soon as the pivot $a$ has traveled somewhat to the right, the pivotal support of the socket F' will be at the left of a line joining the pivots $a$ and $c$, and the link $a'$ will be free to leave the stop $e'$, with which it normally contacts, and move toward the stop $e''$, thus decreasing the distance between the pivots $b$ and $e$ and thereby lessening the effective resistance of the spring against the further opening movement of the valve. A very moderate fluid-pressure will thereafter cause the disk to rise to or approach the position shown by dotted lines. Simultaneously with the unseating of the valve, fluid enters the chamber L by the passages Q and is discharged by the pipe M through the meter M'. The flow alone will indicate the existence of a new condition in the system and by calibrating the meter its reading will serve as a record of the length of time that the valve was open, from which may be estimated the fluid passing through the system unmeasured by the normal-service meter K.

The abutment H is designed to force the spring to assume sufficient lateral flexure to follow the downward movement of the disk after the augmented flow of water shall have ceased, and also to swing back the arm E by a sudden impulse to return it to its initial position as soon as the disk shall have approached its seat. Contact between the disk and seat again closes the passages Q, stopping the flow through the detector meter M' and restoring the system to its normal condition.

I claim:

1. The combination with a main conduit, of a by-pass opening therefrom, a valve situated in the main conduit and being provided in its seat with a passage, means for connecting the passage with the atmosphere, a spring for seating the valve, and connections between the valve and spring whereby the resistance of said spring is lessened as the valve moves from its seat.

2. The combination with a main conduit, of a by-pass opening therefrom, a pivoted valve situated in the main conduit and being provided in its seat with a passage, means for connecting the passage with the atmosphere, a spring for seating the valve, and a link joined to the valve and having a pivotal connection with the spring, the distance between the valve and spring pivots decreasing during the opening movement of the valve.

3. A meter system comprising a main conduit, a by-pass opening therefrom, a meter in the by-pass, a casing included in the main conduit and being provided with a valve seat having openings, means for connecting the openings with the atmosphere, a movable valve member pivoted to the casing and coöperating with the seat, a spring, a connection between one extremity of the spring and the casing, and a connection between the other end of the spring and the movable member, the connection between the spring and valve being movable toward the valve member pivot during the separation of said member from its seat.

ALBERT BLAUVELT.

Witnesses:
S. E. HIBBEN,
SYLVIA BLISS.